United States Patent
Sakhare et al.

(10) Patent No.: US 11,938,911 B2
(45) Date of Patent: Mar. 26, 2024

(54) BRAKE SYSTEM AND METHOD OF MONITORING

(71) Applicant: ArvinMeritor Technology, LLC, Troy, MI (US)

(72) Inventors: Sukrut Sakhare, Troy, MI (US); Alex Adkins, Troy, MI (US); Chris Polmear, Troy, MI (US); Daniel Philpott, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 398 days.

(21) Appl. No.: 17/225,336

(22) Filed: Apr. 8, 2021

(65) Prior Publication Data

US 2022/0324429 A1 Oct. 13, 2022

(51) Int. Cl.
*B60T 17/22* (2006.01)
*B60Q 9/00* (2006.01)
*F16D 66/00* (2006.01)

(52) U.S. Cl.
CPC .............. *B60T 17/221* (2013.01); *B60Q 9/00* (2013.01); *F16D 66/00* (2013.01); *B60T 2270/406* (2013.01); *F16D 2066/001* (2013.01)

(58) Field of Classification Search
CPC .............. B60T 17/221; B60T 2270/406; B60T 2270/413; B60T 17/22; B60Q 9/00; F16D 66/00; F16D 2066/001
See application file for complete search history.

(56) References Cited

U.S. PATENT DOCUMENTS

| | | | |
|---|---|---|---|
| 4,790,606 A | 12/1988 | Reinecke | |
| 5,992,579 A | 11/1999 | Kyrtsos | |
| 9,199,624 B2 | 12/2015 | Philpott et al. | |
| 9,221,395 B2 | 12/2015 | Honig et al. | |
| 9,279,468 B1 | 3/2016 | Philpott | |
| 9,457,782 B2 | 10/2016 | Yao | |
| 9,618,067 B2 | 4/2017 | Philpott | |
| 10,654,462 B2 * | 5/2020 | Hecker | B60T 17/221 |
| 2007/0194623 A1 | 8/2007 | Miyazaki et al. | |
| 2011/0219863 A1 | 9/2011 | Whatley | |
| 2016/0146279 A1 | 5/2016 | Philpott | |
| 2017/0082164 A1 | 3/2017 | Serra et al. | |

(Continued)

FOREIGN PATENT DOCUMENTS

| | | |
|---|---|---|
| CN | 101823482 A | 9/2010 |
| CN | 105452704 A | 3/2016 |

(Continued)

OTHER PUBLICATIONS

Extended European Search Report dated Sep. 14, 2022 for related European Appn No. 22165375.1; 9 Pages.

(Continued)

*Primary Examiner* — James M McPherson
*Assistant Examiner* — Kyle J Kingsland
(74) *Attorney, Agent, or Firm* — Brooks Kushman PC

(57) ABSTRACT

A brake system and a method of monitoring and control. The method may include obtaining data indicative of temperature of a plurality of brake assemblies and determining at least one correlation value based on the temperature data. A mean temperature comparison may be conducted when a correlation value is less than a threshold correlation value.

22 Claims, 5 Drawing Sheets

(56) References Cited

U.S. PATENT DOCUMENTS

2019/0367002 A1* 12/2019 Pursifull ................ B60T 8/885
2020/0172077 A1    6/2020 Burte

FOREIGN PATENT DOCUMENTS

| CN | 107636342 A   | 1/2018  |           |
|----|---------------|---------|-----------|
| CN | 108725417 A   | 11/2018 |           |
| CN | 110219906 A   | 9/2019  |           |
| CN | 110614987 A   | 12/2019 |           |
| CN | 110884646 A   | 3/2020  |           |
| EP | 2860076 A1    | 4/2015  |           |
| EP | 3159232 A1 *  | 4/2017  | B60T 17/221 |
| JP | 6734863 B2    | 8/2020  |           |

OTHER PUBLICATIONS

Office Action dated Oct. 23, 2023 for related Chinese patent application No. 202210365045.3; 7 Pages.

* cited by examiner

BRAKE SYSTEM AND METHOD OF MONITORING

TECHNICAL FIELD

This relates to a brake system for a vehicle and a method of monitoring the brake system.

BACKGROUND

A method of controlling a brake system of a vehicle is disclosed in U.S. Pat. No. 9,199,624.

SUMMARY

In at least one embodiment a method of monitoring a brake system is provided. The method includes obtaining data indicative of temperature of at least a first brake assembly and a second brake assembly. A correlation value between temperature of the first brake assembly and temperature of the second brake assembly may be determined. A mean temperature comparison may be conducted when the correlation value is less than a threshold correlation value.

In at least one embodiment a method of monitoring a brake system is provided. The method includes obtaining data indicative of temperature of a set of brake assemblies. Correlation values between pairs of brake assemblies are determined based on the data. The correlation values are compared to a threshold correlation value to determine whether any correlation value is less than the threshold correlation value. A mean temperature comparison is conducted when at least one correlation value is less than the threshold correlation value. Conducting the mean temperature comparison may include determining a candidate mean temperature of a brake assembly that has a correlation value that is less than the threshold correlation value, determining a group mean temperature of the brake assemblies that have correlation values that are not less than the threshold correlation value, and determining whether the candidate mean temperature is sufficiently close to the group mean temperature. An alert notification may be provided when the candidate mean temperature is not sufficiently close to the group mean temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
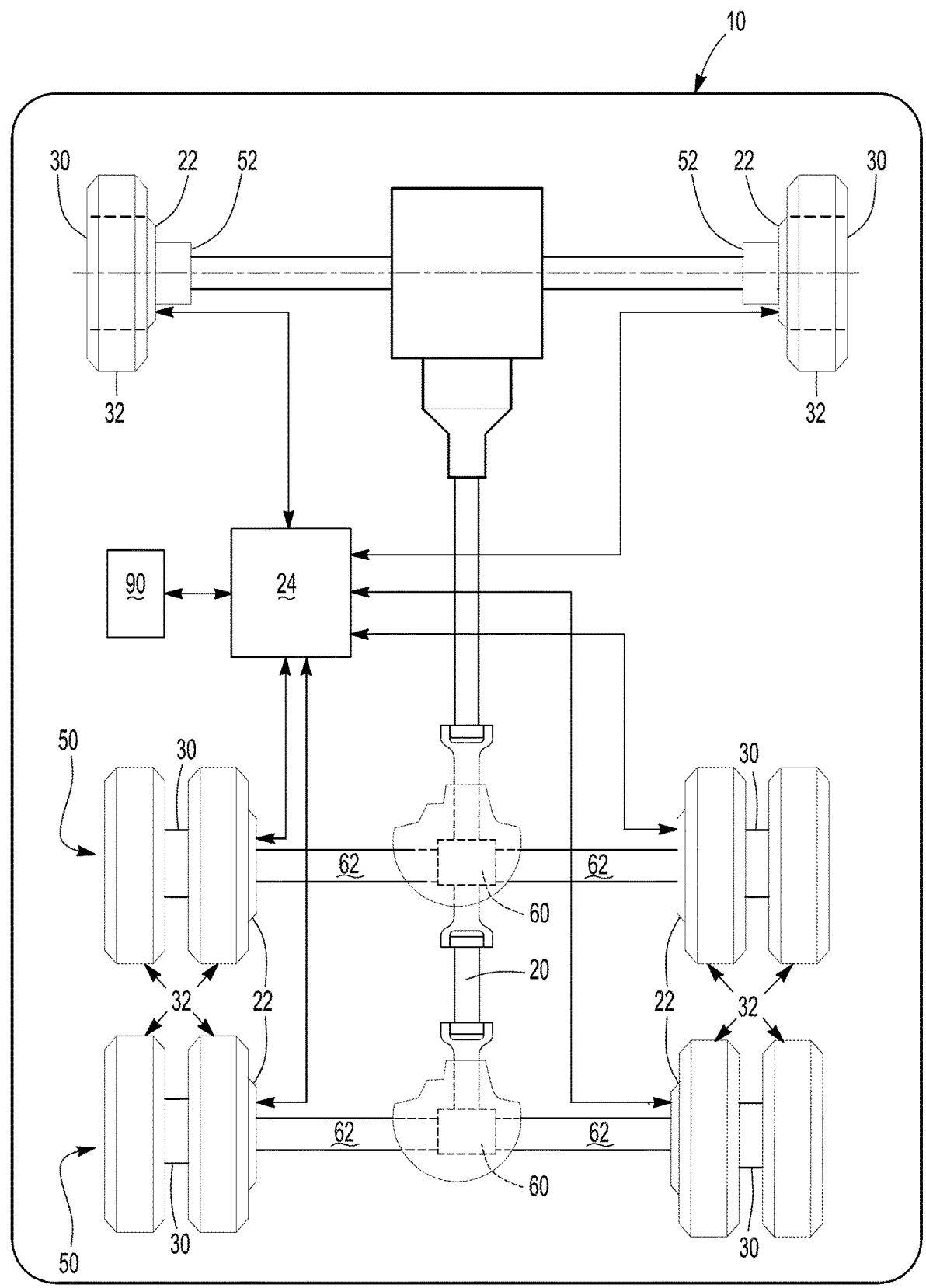
FIG. 1 shows an example of a vehicle having a brake system.

Referring to FIG. 1, an example of a vehicle 10 is shown. The vehicle 10 may be a vehicle like a truck, farm equipment, military transport or weaponry vehicle, or cargo loading equipment for land, air, or marine vessels. The vehicle 10 may include a trailer for transporting cargo in one or more embodiments.

The vehicle 10 may include a brake system 20 that may include a plurality of brake assemblies 22 and a control system 24.

A brake assembly 22 may facilitate braking of a wheel 30 upon which at least one tire 32 may be disposed. Each brake assembly 22 may be configured to brake a different wheel 30. A brake assembly 22 may be configured as a friction brake, such as a disc brake or a drum brake. For brevity, the brake assembly 22 will primarily be discussed as being a disc brake in the text below.

Figure 2:
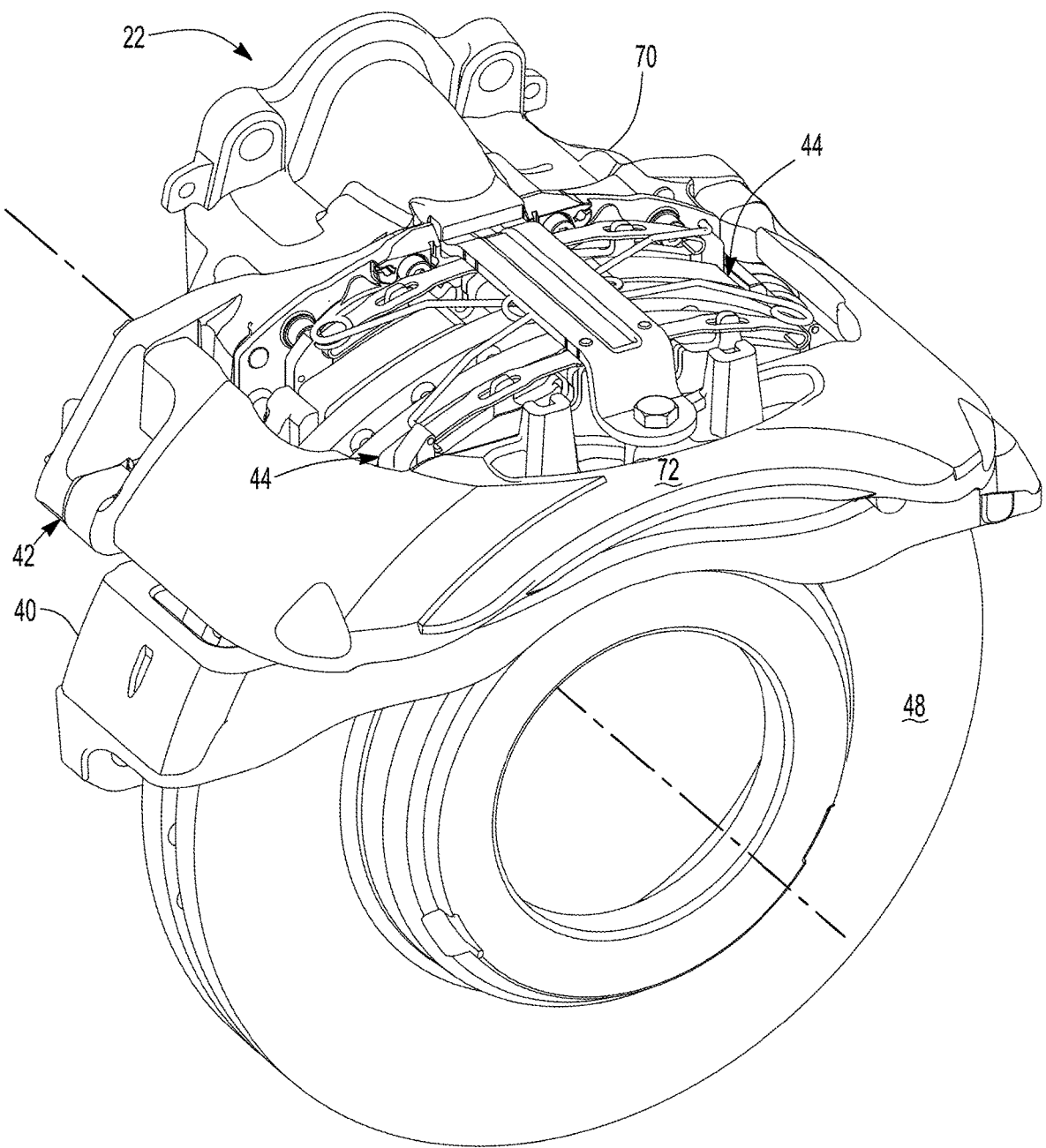
FIG. 2 is a perspective view of an example of a brake assembly that may be provided with the brake system.
Figure 3:
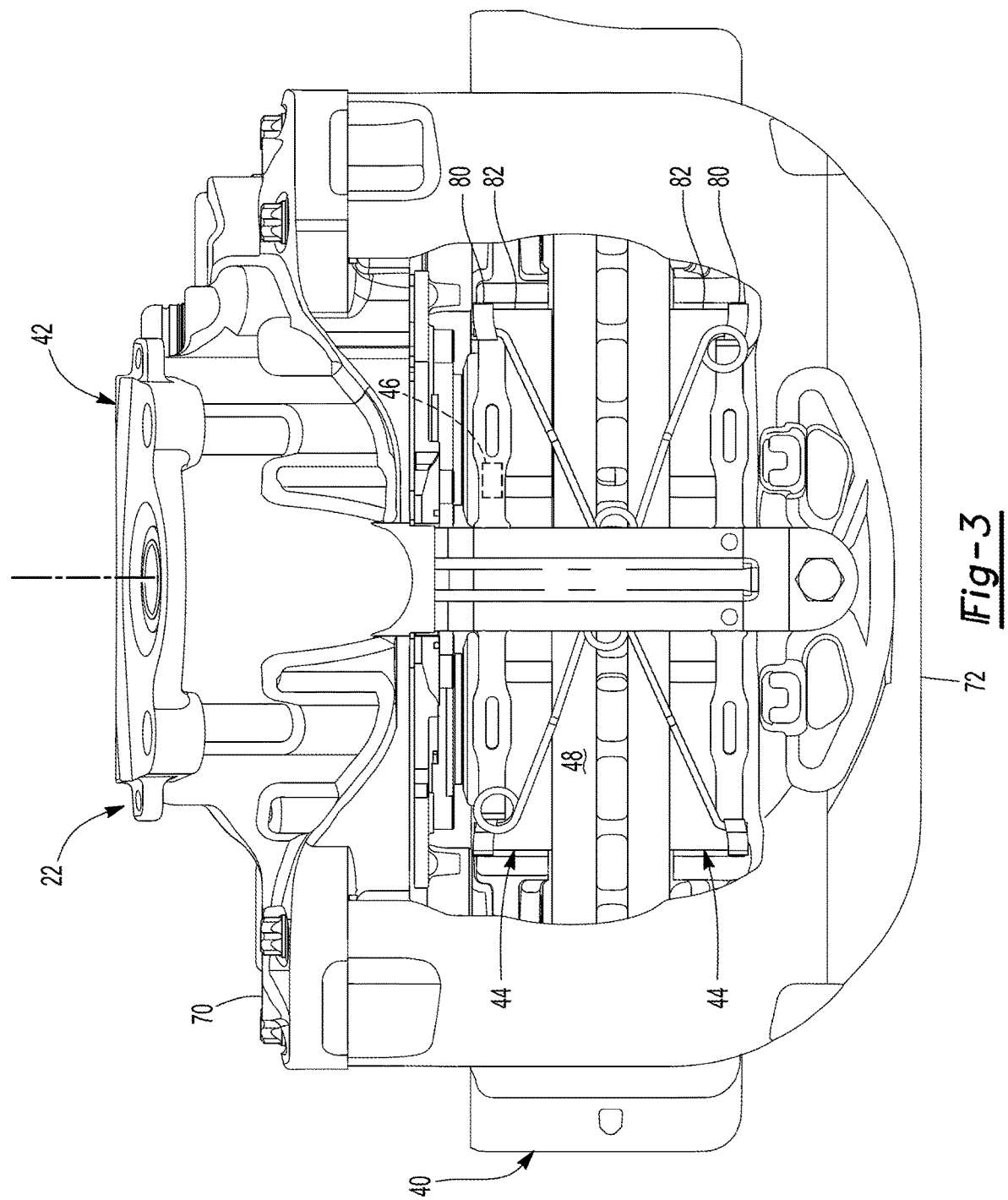
FIG. 3 is a plan view of the brake assembly of FIG. 2.

An example of a brake assembly 22 that is configured as a disc brake is shown in FIG. 2. In at least one configuration, the brake assembly 22 may include a brake carrier 40, a brake caliper 42, and at least one brake pad assembly 44. The brake assembly 22 may also include at least one sensor 46, an example of which is best shown in FIG. 3. In a drum brake configuration, a brake pad assembly may be pivotally supported on a brake spider and components such as a brake carrier and brake caliper may be omitted as is known by those skilled in the art.

The brake carrier 40 may facilitate mounting of the brake assembly 22. For instance, the brake carrier 40 may be fixedly mounted to a component of the vehicle 10, such as an axle assembly 50 or a knuckle, such as a steering knuckle 52, examples of which are best shown in FIG. 1.

An axle assembly 50 may support multiple brake assemblies 22. An axle assembly 50 may have a drive axle configuration or a non-drive axle configuration. In a drive axle configuration, torque may be transmitted between at least one torque source, such as an electric motor or an internal combustion engine, and a wheel 30. For instance, torque may be transmitted between the torque source and a wheel 30 via a differential assembly 60 and an axle shaft 62 in a manner known by those skilled in the art. In a non-drive axle configuration, torque may not be transmitted between a torque source and an associated wheel 30.

A steering knuckle 52 may be part of a steering system that may be used to steer or change the direction of the vehicle 10. A steering knuckle 52 may support a brake assembly 22 and at least one wheel 30. A wheel 30 associated with a steering knuckle 52 may or may not be operatively connected to a torque source.

Referring to FIGS. 2 and 3, the brake carrier 40 may receive and support the brake pad assemblies 44 and may include an opening through which a brake rotor 48 may extend. As such, the brake carrier 40 may straddle the brake rotor 48 and may help position brake pad assemblies 44 on opposite sides of the brake rotor 48.

The brake caliper 42 may be mounted to the brake carrier 40 and may support various components of the brake assembly 22. In addition, the brake caliper 42 may help position the brake pad assemblies 44 with respect to the brake rotor 48 to facilitate braking of the vehicle 10 as will be discussed in more detail below. In at least one configuration, the brake caliper 42 may include a caliper housing 70 and a caliper bridge 72.

The caliper housing 70 may be moveably disposed on the brake carrier 40. For example, the caliper housing 70 may be slidable along a pair of guide pins that may be fixedly disposed on the brake carrier 40. The caliper housing 70 may receive or support various components that may facilitate actuation of a brake pad assembly 44. For instance, the caliper housing 70 may support at least one tappet that may be moveable toward and away from the brake rotor 48. For example, an actuator may extend the tappet to actuate a brake pad assembly 44 that is disposed between the caliper housing 70 and the brake rotor 48 into engagement with the brake rotor 48. A reaction force may then move the caliper housing 70 and caliper bridge 72 with respect to the brake carrier 40 to actuate a brake pad assembly 44 that is disposed between the caliper bridge 72 and the brake rotor 48 into engagement with an opposite side of the brake rotor 48 to help slow rotation of the brake rotor 48 and an associated vehicle wheel 30.

The caliper bridge 72 may be fixedly positioned with respect to the caliper housing 70. The caliper bridge 72 may be integrally formed with the caliper housing 70 or may be a separate component that is mounted to the caliper housing 70. For example, the caliper bridge 72 may be coupled or secured to the caliper housing 70 with one or more fasteners, such as bolts. In at least one configuration, the caliper bridge 72 may cooperate with the caliper housing 70 to define a cavity that may at least partially receive the brake pad assemblies 44 and the brake rotor 48.

A pair of brake pad assemblies 44 may be received in the brake carrier 40 and the cavity. The brake pad assemblies 44 may be disposed on opposite sides of the brake rotor 48 and may have similar or identical configurations. In at least one configuration and as is best shown with reference to FIG. 3, a brake pad assembly 44 may include a backplate 80 and friction material 82.

The backplate 80 may be a structural member of the brake pad assembly 44. The backplate 80 may be configured as a generally flat plate and may be made of any suitable material, such as a metal alloy. The backplate 80 of the inboard brake pad assembly 44 that is disposed above the brake rotor 48 from the perspective shown in FIG. 3 may engage the tappet. The backplate 80 of the outboard brake pad assembly 44 that is disposed below the brake rotor 48 from the perspective shown in FIG. 3 may engage the caliper bridge 72.

The friction material 82 may be disposed on a side of the backplate 80 that may face toward the brake rotor 48. The friction material 82 may contact the brake rotor 48 during vehicle braking.

Referring to FIG. 3, an example of a sensor 46 is shown. The sensor 46 may be a temperature sensor of any suitable type. For instance, the sensor 46 may be a thermistor, thermocouple, infrared temperature sensor, semiconductor-based temperature sensor, or the like. The sensor 46 may detect or provide a signal that is indicative of the temperature proximate the sensor 46. For example, the sensor 46 may detect or provide a signal that is indicative of the temperature of a brake pad assembly 44. The sensor 46 may be located in any suitable location. For instance, a sensor 46 may be mounted on a brake pad assembly 44, such as on the backplate 80 of a brake pad assembly 44. It is also contemplated that the sensor 46 may be located near or adjacent to a brake pad assembly 44, such as on the brake carrier 40, the brake caliper 42, or tappet.

In a drum brake configuration, the sensor 46 may be disposed proximate a brake pad assembly and the brake pad assembly may be curved or may extend along an arc. In addition, the brake pad assembly may be pivotally supported on a brake spider, components such as a brake carrier and brake caliper may be omitted, and a brake drum may be provided rather than a brake rotor as is known by those skilled in the art.

Referring to FIG. 1, the control system 24 may monitor and/or control operation of the brake system 20. The control system 24 may include one or more electronic controllers, such as a microprocessor-based controller that may monitor and/or control the brake system 20. A controller may be disposed on the vehicle 10, may be remotely positioned from and may wirelessly communicate with the vehicle 10, or combinations thereof. The control system 24 may communicate with or receive data or signals from the sensors 46. In addition, the control system 24 may communicate with or provide information to a communication device 90.

The communication device 90 may provide information to a vehicle operator or vehicle occupant. For instance, the communication device 90 may be configured to provide information to the operator related to the operating state of the brake system 20. For example, the communication device 90 may communicate the status of the brake system 20 and/or may provide a notification such as a warning or alert based on temperature data from the sensors 46. Information may be provided to the operator in one or more formats, such as an audible format, visual format, and/or haptic format. Examples of communication devices 90 include but are not limited to a light, display, touchscreen, bell, chime, vibratable seat, vibratable steering wheel, or the like.

Figure 4:
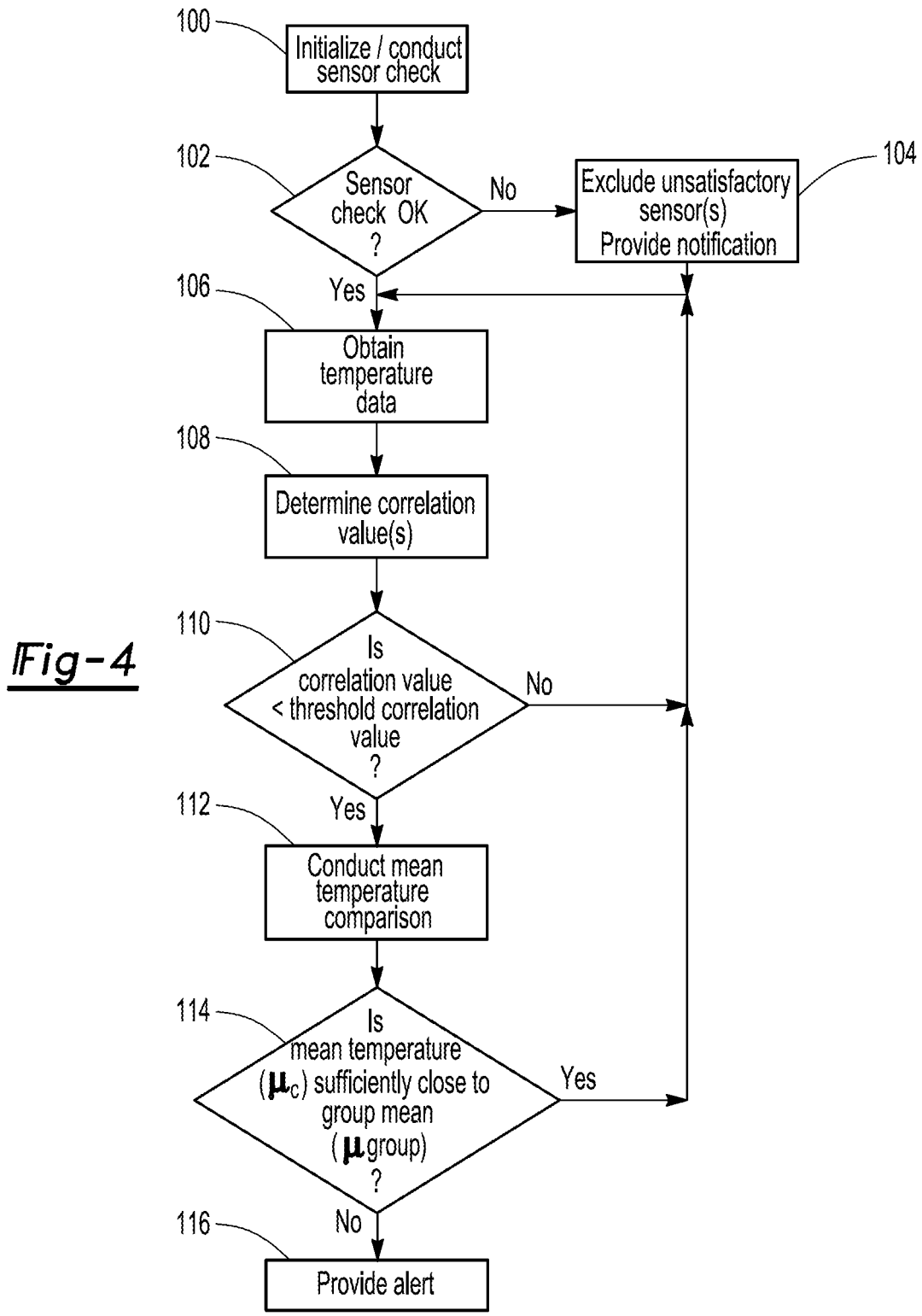
FIG. 4 is a flowchart of a method of monitoring and controlling a brake system.

Referring to FIG. 4, a flowchart of an exemplary method of monitoring of the brake system 20 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method. The illustrated functions may be modified, or in some cases omitted, without departing from the scope intended.

In at least one embodiment, the method may be executed by the control system 24 and may be implemented as a closed loop control system. Moreover, the method may be enabled or disabled based on the operating state of the vehicle 10. For example, the method or control logic may be automatically enabled when the vehicle is turned on, when the vehicle 10 is in motion, or combinations thereof. In addition, the method may be manually activated and/or deactivated.

As an overview, multiple brake assemblies 22 are typically operated in unison in multi-wheeled vehicles. For instance, applying the brakes may actuate multiple brake assemblies 22 at the same time to slow, stop, or inhibit the rotation of corresponding wheels 30. Conversely, the brake assemblies 22 may also be released at the same time to permit the rotation corresponding wheels 30. Engaging the friction material 82 of the brake pad assemblies 44 against a brake rotor 48 or brake drum results in friction and heat generation that may be detected the sensor 46 of a corresponding brake assembly 22. Disengaging the friction material 82 from a brake rotor 48 or brake drum may terminate this friction and allow the brake assembly 22 to cool, which may also be detected by the sensor 46. Consequently, it is expected that the temperatures of the brake assemblies will be correlated with each other (e.g., it is expected that brake temperatures will rise and fall at the same or similar rates) and that the average or mean temperatures of each brake assembly 22 will be similar but not necessarily identical to each other. A brake assembly that has temperatures that do not meet these expectations may not be operating properly. For instance, a brake assembly that does not experience a similar brake temperature increase and/or rate of brake temperature increase during braking as one or more other brake assemblies may not be operating properly or may have a damaged or missing brake pad assembly.

Under certain conditions, temperature correlations between brake assemblies alone may be insufficient to reliably identify a brake assembly performance issue. For instance, when the temperature of the brake assemblies is not changing or is generally in a steady-state (e.g., brake assemblies have not been applied for a long period of time such as during highway cruising) there may be low temperature change rates but significantly different brake assembly temperatures, such as when brake pad assemblies of one brake assembly have properly retracted while another a brake pad assembly of another brake assembly has not properly retracted and is dragging on a brake rotor. Thus, significant differences in average or mean brake assembly temperatures may provide more refined monitoring capabilities as compared to temperature correlations alone.

At block 100, method may begin by initializing the control system 24 and conducting a sensor check. Initializing the control system 24 may include resetting various counters and clearing data from memory. A sensor check may be conducted to determine whether the sensors 46 are operating and communicating as expected. A sensor check may be conducted for each sensor 46.

At block 102, the method may determine whether a sensor passed the sensor check. A sensor may pass the sensor check when data or a signal is received by the control system controller from the sensor 46 and the data or signal is within normal operating parameters. A sensor 46 that fails the sensor check may be deemed unsatisfactory or inoperative. A sensor 46 may be deemed unsatisfactory or inoperative when a signal or data is not received from the sensor 46. A sensor 46 may also be deemed unsatisfactory when the signal or data from the sensor 46 is indicative of unrealistic temperature values. Examples of unrealistic temperature values include temperature values that are outside of the temperature detection range of the sensor 46 and temperature fluctuations that change by a large magnitude in a short period of time. As an example, a signal that is indicative of a temperature change that exceeds a predetermined magnitude per unit of time may be indicative of a malfunctioning sensor. As a nonlimiting example, a temperature change of more than 20° C. at the sampling rate of the sensor (e.g., 20° C. per millisecond) may be indicative of a malfunctioning sensor. If the sensor did not pass the sensor check, then the method may continue at block 104. If the sensor passed the sensor check, the method may continue at block 106.

At block 104, the method may exclude an unsatisfactory sensor 46. Temperature data from an unsatisfactory sensor or a sensor that fails the sensor check may not be used in subsequent method steps. In addition, a notification may be provided that a sensor 46 has failed the sensor check. The notification may be communicated via the communication device 90 and may optionally identify the particular sensor 46 or sensors 46 that have failed the sensor check so that potential repairs may be made.

At block 106, temperature data may be obtained. Temperature data may be obtained from the sensors 46 that passed the sensor check and may be stored in memory. Temperature data may be obtained from each sensor for a predetermined period of time or may be obtained to build a predetermined sample size (e.g., a predetermined number of data points may be obtained) before proceeding to block 108. As an example, temperature data may be sampled so that at least 200 data points are obtained; however, it is contemplated that a larger or smaller sample size or number of data points may be used. As another example, a sensor with a sampling rate of 1 millisecond may collect data for at least 200 milliseconds. Again, it is contemplated that a longer or shorter data collection period may be used.

At block 108, correlation values may be determined based on the temperature data. More specifically, correlation values may be based on data from each sensor 46 that passed the sensor check. Correlation values may be correlation coefficients, such as Pearson correlation coefficients that may measure the linear correlation between two sets of data (e.g., covariance of the temperature data from two different brake assemblies divided by the product of their standard deviations). For instance, in a vehicle having four brake assemblies in which the sensor 46 associated with each of the four brake assemblies has passed the sensor check, correlation values or correlation coefficients may be determined between the first and second brake assemblies, the first and third brake assemblies, the first and fourth brake assemblies, second and third brake assemblies, the second and fourth brake assemblies, and the third and fourth brake assemblies. The correlation value or correlation coefficient may have a value between 1 and −1. Correlation values may not be determined for members of the set of brake assemblies having sensors that failed the sensor check.

At block 110, the method may determine whether a correlation value is less than a threshold correlation value. Such a determination may be made for each correlation value that has been determined or calculated at block 108. The threshold correlation value may be a predetermined value that may be based on design requirements or vehicle development testing and may be indicative of a significant lack of correlation between the temperatures of the two brake assemblies being compared. For instance, the predetermined value may be a number that is closer to zero than it is to 1 or −1, such as 0.4. If the correlation value is not less than the threshold correlation value, then the method may return to block 106 and obtain additional temperature data. Obtaining additional temperature data may include using a rolling data window that partially overlaps or partially utilizes the data from a previous iteration. For instance, a rolling data window may include additional temperature data that was not included in the previous iteration but may maintain the same sample size or number of data points as the previous iteration. As a more specific example, one iteration of the method may be based on a first period of time (e.g., time 100 to time 300) or a first data set (e.g., data points 100 to 300). The data window may be rolled forward in the next iteration and may be based on a second period of time (e.g., time 101 to time 301) or a second data set (e.g., data points 101 to 301) that overlaps the previous set. If the correlation value is less than the threshold correlation value, then the method may continue at block 112.

At block 112, a mean temperature comparison may be conducted. Conducting the mean temperature comparison may include determining multiple mean temperature values. These mean temperature values may include at least one candidate mean temperature ($\mu c$) and a group mean temperature ($\mu_{group}$). The candidate mean temperature may be the mean temperature for a brake assembly that has a correlation value that is less than the threshold correlation value. The candidate mean temperature may be the average temperature value for the sample (e.g., total of the temperature values in the sample for the candidate brake assembly divided by the sample size or number of data points in the sample). The group mean temperature may be the mean temperature for the other brake assembly when only two brake assemblies have sensors that have passed the sensor check or may be the mean temperature for one or more brake assemblies that have a correlation value that is not less than the threshold correlation value. For illustration purposes, in a vehicle that has four brake assemblies and in which the fourth brake assembly is not sufficiently correlated with the first, second, and third brake assemblies (i.e., the correlation values or correlation coefficients between the first and second brake assemblies, the first and third brake assemblies, and second and third brake assemblies are all greater than the threshold correlation value, while the correlation values or correlation coefficients between the first and fourth brake assemblies, the second and fourth brake assemblies, and the third and fourth brake assemblies are less than the threshold correlation value) the mean candidate temperature ($\mu_c$) is the average sample temperature for the fourth brake assembly ($\mu_4$) while the group mean temperature ($\mu_{group}$) is the average sample temperature for the first, second, and third brake assemblies in combination ($[\mu_1+\mu_2+\mu_3]/3$).

As another example, the group mean temperature may be associated with a particular axle assembly. For instance, the group mean temperature may be based on the axle assembly that is not associated with the candidate mean temperature. As a more specific illustration based on the example above, the group mean temperature ($\mu_{group}$) may be the average sample temperature for the first and second brake assemblies in combination ($[\mu_1+\mu_2]/2$) when the first and second brake assemblies are provided with a first axle assembly and the fourth brake assembly is provided with a second axle assembly.

As another example, the group mean temperature may be based on which side of the vehicle a brake assembly is disposed along (e.g., driver side or passenger side), as wheels that are located on the same vehicle side are likely traversing along the same terrain or environmental conditions. As more specific illustration, the group mean temperature ($\mu_{group}$) may be the average sample temperature for the first and third brake assemblies in combination ($[\mu_1+\mu_3]/2$) when the first and third brake assemblies are provided along a first side of the vehicle (e.g., driver side) and the fourth brake assembly is provided along a second side or opposite side of the vehicle (e.g., passenger side).

At block 114, the method may determine whether the candidate mean temperature ($\mu_c$) sufficiently close to the group mean temperature ($\mu_{group}$). The candidate mean temperature may be sufficiently close to the group mean temperature when the candidate mean temperature is within a predetermined range with respect to the group mean temperature. The predetermined range may be based on performance requirements or vehicle development testing. In addition, the predetermined range may be constant or dynamic. An example of a constant predetermined range is ±20° C.; however, larger or smaller ranges are contemplated. In this example, the candidate mean temperature may be sufficiently close to the group mean temperature when the candidate mean temperature is within ±20° C. of the group mean temperature. A dynamic predetermined range may not be constant. In at least one configuration, a dynamic predetermined range may be based on the location of the vehicle. For instance, a vehicle operating in hotter environments are hotter ambient conditions may have higher candidate and mean group temperatures and may have brake assembly that cool less rapidly as compared to colder environments. Different dynamic ranges may be stored in a lookup table and may be selected based on the location of the vehicle, which may be provided manually (e.g., by the vehicle operator) or automatically (e.g., from a navigation system, global positioning system, or the like). It is also contemplated that dynamic ranges may be selected based on ambient temperature and/or ambient relative humidity. If the candidate mean temperature is sufficiently close to the group mean, then the method may execute another iteration of the method and obtain additional temperature data at block 106 (additional data may be obtained in the manner previously discussed with respect to block 110). If the candidate mean temperature is not sufficiently close to the group mean, then the method may continue at block 116.

At block 116, an alert notification may be provided. The alert notification may be provided when the candidate mean temperature is not sufficiently close to the group mean temperature during at least one iteration of the method. It is also contemplated that the candidate mean temperatures may be compared to group mean temperatures over multiple iterations of the method before providing an alert notification to increase confidence that the alert notification is representative of actual brake assembly performance. As an example, an alert notification may not be provided unless candidate mean temperatures are not sufficiently close to group mean temperatures over multiple consecutive iterations of the method.

Iterations of the method may be based on non-overlapping or overlapping data. For instance, an alert notification may be provided when the candidate mean temperature is not sufficiently close to the group mean temperature for multiple consecutive nonoverlapping periods of time or for multiple consecutive nonoverlapping data sets (e.g., at least two consecutive nonoverlapping data sets—two consecutive nonoverlapping data sets, three consecutive nonoverlapping data sets, etc.). As an example, the candidate mean temperature and the group mean temperature may be determined based on a first period of time (e.g., time 1000 to time 1200) or with a first data set (e.g., data points 1000 to 1200). The method may determine at least one additional candidate mean temperature and group mean temperature based on a second period of time that immediately follows the first period of time (e.g., time 1201 to time 1401 or with a second data set that immediately follows and does not overlap the first data set (e.g., data points 1201 to 1401).

As another example, an alert notification may be provided when the candidate mean temperature is not sufficiently close to the group mean temperature for multiple consecutive overlapping periods of time or for multiple consecutive overlapping data sets (e.g., two overlapping data sets, three overlapping data sets, etc.). As an example, the candidate mean temperature and the group mean temperature may be determined based on a first period of time (e.g., time 1000 to time 1200) or with a first data set (e.g., data points 1000 to 1200). The method may determine at least one additional candidate mean temperature and group mean temperature based on a second period of time that immediately follows and overlaps the first period of time (e.g., time 1001 to time 1201) or with a second data set that immediately follows and does not overlap the first data set (e.g., data points 1201 to 1400). It is also contemplated that overlap may be decreased such that the first period of time and the second period of time may have more than one different time point or data point.

Figure 5:
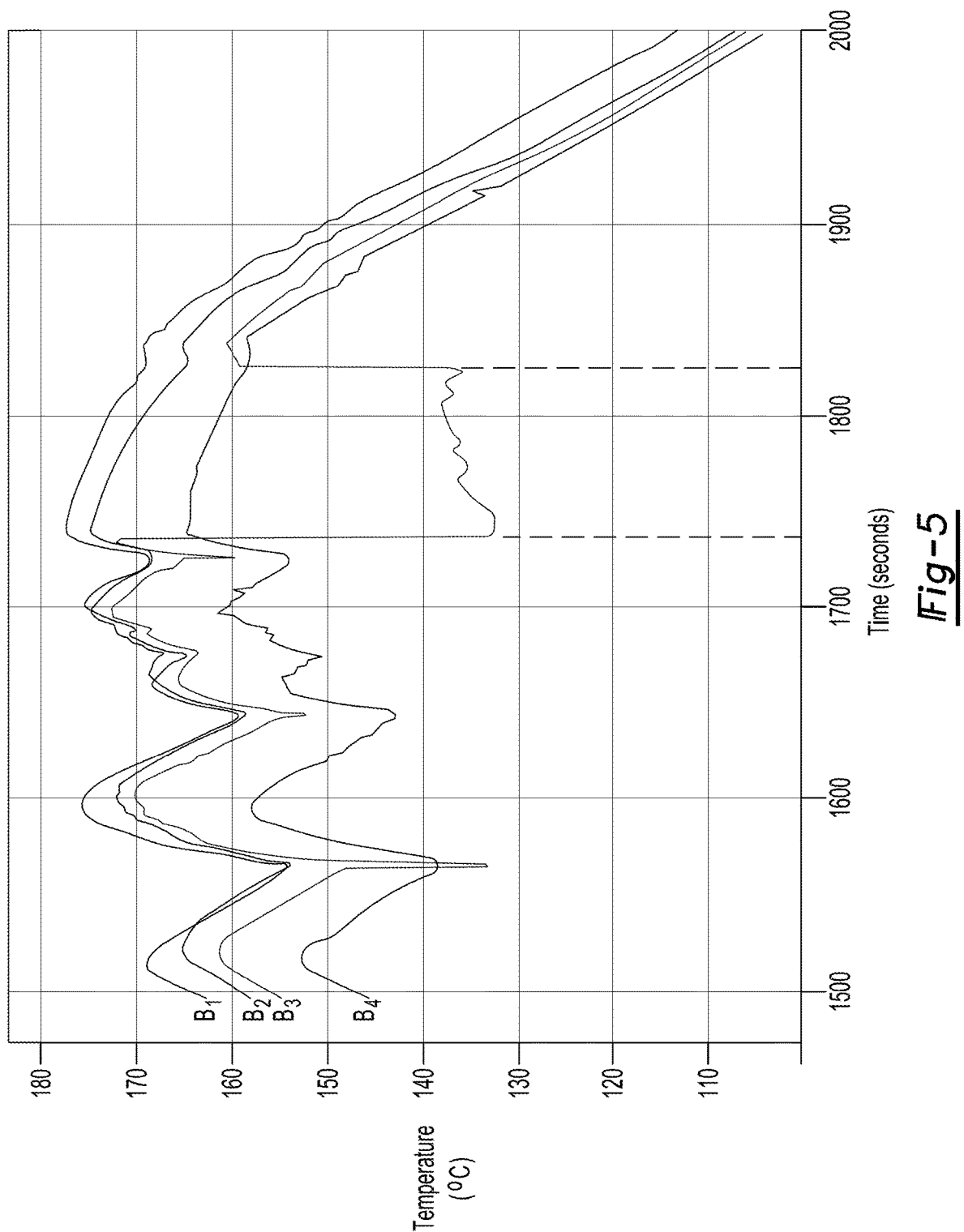
FIG. 5 is a plot that illustrates examples of brake assembly temperatures over time.

Referring to FIG. 5, a plot of brake temperatures over time is shown to help illustrate aspects of the method. The four plotted lines in FIG. 5 represent the temperatures of four different brake assemblies ($B_1$ through $B_4$) over time. Temperature data is not shown before 1500 seconds and after 2000 seconds for clarity.

From time 1500 through approximately time 1725, the temperatures of all four brakes are highly correlated (e.g., rise and fall together) and have average temperatures that are within less than 20° C. of each other. The temporary short duration drop in the temperature of brake assembly $B_3$ at approximately time 1575 may be insufficient to trigger an alarm notification, such as when alert notifications are based on multiple data sets in which the candidate mean temperature is not sufficiently close to the group mean temperature.

At approximately time 1725 to time 1820, the temperature of brake assembly $B_3$ diverges from the temperature of the other three brake assemblies ($B_1$, $B_2$, and $B_4$) for a longer period of time while brake assemblies ($B_1$, $B_2$, and $B_4$) remain highly correlated with each other and have average temperatures that are within less than 20° C. of each other. As such, the method may determine that the correlation value for brake assembly $B_3$ with respect to the other three brake assemblies is less than the threshold correlation value and thus is not sufficiently correlated with the other three brake assemblies. The mean temperature comparison may be conducted such that the candidate mean temperature GO is the mean temperature of brake assembly $B_3$ while the group mean temperature ($\mu_{group}$) is the mean temperature of brake assemblies $B_1$, $B_2$, and $B_4$. An alert may be provided since the mean temperature of brake assembly $B_3$ is more than 20° C. less than the group mean temperature of brake assemblies $B_1$, $B_2$, and $B_4$ during this long time period.

A brake system and method as described above may allow multiple brake assemblies to be monitored and compared in real time to determine whether the brake assemblies are functioning properly. The method may utilize reliable low-cost temperature sensors that may be easily accessed and inspected and may not need to employ additional types of sensors (e.g., position sensors) to assess brake functionality. The method may allow brake functionality to be assessed using correlation values that may represent or act as a "score" for multiple data points in a particular time window, which in turn may reduce the amount of raw data that need to be stored in memory. Moreover, by comparing correlation values and mean temperature values computational demands and memory storage space may be reduced, which may allow a lower cost control system to be provided, such as with less memory or less expensive computation platforms.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of monitoring a brake system, the method comprising:
obtaining data indicative of temperature of a first brake assembly and temperature of a second brake assembly;
determining a correlation value between temperature of the first brake assembly and temperature of the second brake assembly;
determining whether the correlation value is less than a threshold correlation value; and
conducting a mean temperature comparison when the correlation value is less than the threshold correlation value.

2. The method of claim 1 wherein a first sensor provides data indicative of the temperature of the first brake assembly and a second sensor provides data indicative of the temperature of the second brake assembly.

3. The method of claim 1 further comprising conducing a sensor check and excluding data indicative of temperature obtained from a sensor that does not pass the sensor check.

4. The method of claim 3 further comprising providing a notification via a communication device when the sensor does not pass the sensor check.

5. The method of claim 3 wherein the sensor check is conducted before determining the correlation value.

6. The method of claim 3 wherein the sensor check is conducted before obtaining data indicative of temperature.

7. The method of claim 1 wherein obtaining data indicative of temperature includes obtaining a predetermined number of data points indicative of the temperature of the first brake assembly and obtaining a predetermined number of data points indicative of the temperature of the second brake assembly.

8. The method of claim 1 wherein a first sensor provides data indicative of the temperature of the first brake assembly, a second sensor provides data indicative of the temperature of the second brake assembly, and the method includes obtaining additional temperature data from the first sensor and the second sensor and recalculating the correlation value based on a rolling data window that includes the additional temperature data when the correlation value is not less than the threshold correlation value.

9. The method of claim 1 wherein an alert notification is provided when a mean temperature of the first brake assembly is not sufficiently close to a mean temperature of the second brake assembly.

10. The method of claim 1 wherein an alert notification is provided when a mean temperature of the first brake assembly is not sufficiently close to a mean temperature of the second brake assembly for at least three overlapping data sets.

11. The method of claim 1 wherein an alert notification is provided when a mean temperature of the first brake assembly is not sufficiently close to a mean temperature of the second brake assembly for at least two consecutive non-overlapping data sets.

12. A method of monitoring a brake system, the method comprising:
obtaining data indicative of temperature of a set of brake assemblies;
determining correlation values between pairs of brake assemblies based on the data;
determining whether any correlation value is less than a threshold correlation value;

conducting a mean temperature comparison when at least one correlation value is less than the threshold correlation value by (a) determining a candidate mean temperature of the brake assembly having the correlation value that is less than the threshold correlation value, (b) determining a group mean temperature of the brake assemblies having correlation values that are not less than the threshold correlation value, and (c) determining whether the candidate mean temperature is sufficiently close to the group mean temperature; and providing an alert notification when the candidate mean temperature is not sufficiently close to the group mean temperature.

13. The method of claim 12 wherein each member of the set of brake assemblies is configured to brake a different wheel.

14. The method of claim 12 wherein determining whether the candidate mean temperature is sufficiently close to the group mean temperature includes determining whether the candidate mean temperature is within a predetermined range with respect to the group mean temperature.

15. The method of claim 12 wherein a sensor is provided with each member of the set of brake assemblies and a sensor check is conducted before determining correlation values.

16. The method of claim 15 wherein correlation values are not determined for members of the set of brake assemblies having sensors that do not pass the sensor check.

17. The method of claim 16 wherein the group mean temperature does not include data from any sensor that does not pass the sensor check.

18. The method of claim 12 wherein the alert notification is provided when the candidate mean temperature is not sufficiently close to the group mean temperature for three consecutive nonoverlapping periods of time.

19. The method of claim 12 wherein the set of brake assemblies includes first and second brake assemblies that are provided with a first axle assembly and third and fourth brake assemblies that are provided with a second axle assembly.

20. The method of claim 19 wherein correlation values are determined for the first and second brake assemblies, the first and third brake assemblies, the first and fourth brake assemblies, the second and third brake assemblies, the second and fourth brake assemblies, and the third and fourth brake assemblies.

21. A brake system comprising:
a first brake assembly comprising a first sensor that provides data indicative of temperature of the first brake assembly;
a second brake assembly comprising a second sensor that provides data indicative of temperature of the second brake assembly; and
a control system comprising a controller configured to:
determine a correlation value between temperature of the first brake assembly and temperature of the second brake assembly;
determine whether the correlation value is less than a threshold correlation value; and
conduct a mean temperature comparison when the correlation value is less than the threshold correlation value.

22. A brake system comprising:
a control system comprising a controller configured to:
receive data indicative of temperature of a first brake assembly and temperature of a second brake assembly;
determine a correlation value between temperature of the first brake assembly and temperature of the second brake assembly;
determine whether the correlation value is less than a threshold correlation value; and
conduct a mean temperature comparison when the correlation value is less than the threshold correlation value.

* * * * *